United States Patent Office 3,127,958
Patented Apr. 7, 1964

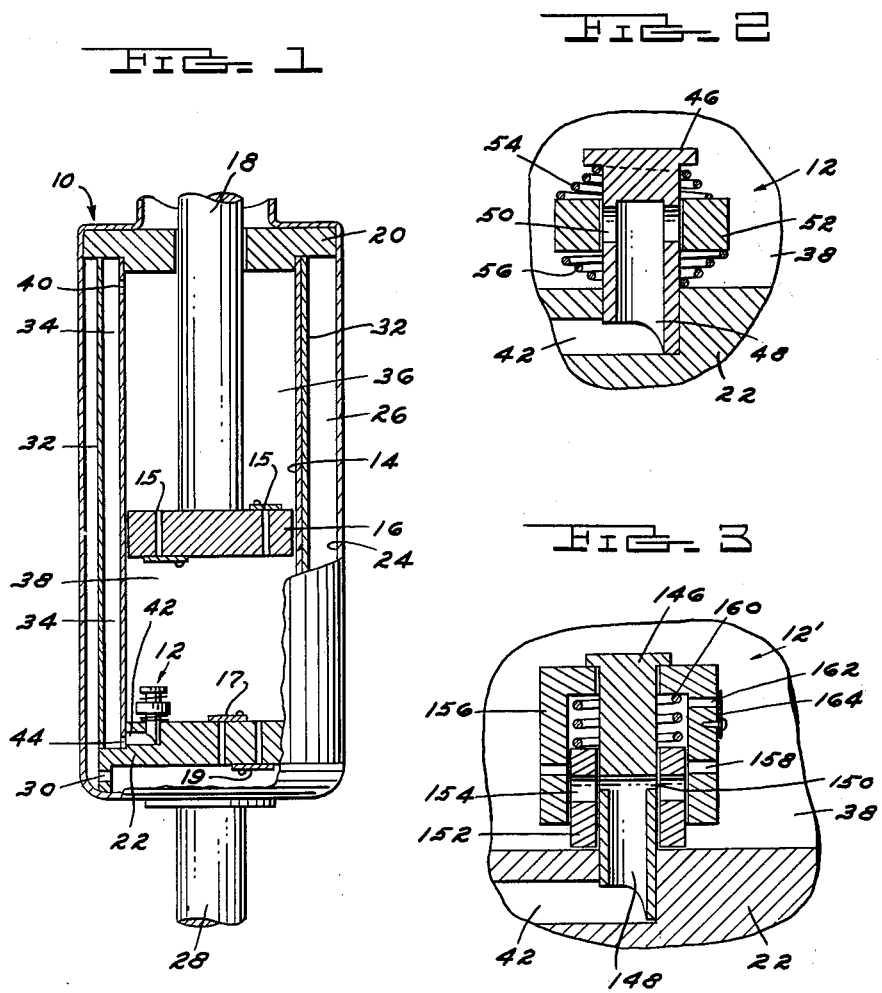

3,127,958
SHOCK ABSORBER WITH IMPROVED
RELIEF VALVE STRUCTURE
Henry T. Szostak, Orange, Calif., assignor to Ford Motor Company, Dearborn, Mich., a corporation of Delaware
Filed June 30, 1961, Ser. No. 120,997
6 Claims. (Cl. 188—88)

This invention relates to shock absorber units and more particularly to inertia sensitive valving for such units.

The shock absorber portion of a motor vehicle suspension system is designed to dampen relative movement between sprung and unsprung vehicle parts. This is accomplished by the restricted flow of hydraulic fluid through control orifices and valving within the unit.

The motor vehicle having the shock absorber may be operated on an extremely wide variety of different road surfaces, and therefore, the design of the shock absorber is a compromise adapted to give adequate control over both smooth and rough roads.

In accordance with the present invention, a shock absorber is provided in which the design is not a compromise, but rather has valving that accommodates specific operating conditions.

The present invention provides a shock absorber that is an adaptation of those conventional units having a valved piston operating in a pressure tube in conjunction with a foot valve closure member sealing the end of the pressure tube. More specifically, this invention provides a communicating passageway between the compression and rebound pressure chambers which is controlled by an inertia sensitive valve assembly. The valve assembly is secured to that portion of the shock absorber mounted on unsprung suspension components and is adapted to permit fluid flow between the pressure chambers when its inertia element experiences high vertical acceleration.

The valving of the piston and foot valves are modified to provide improved control over body motions subject to large amplitude, low frequency oscillations such as might occur during operation on an undulating road surface. Normally, this type of control would tend to produce extreme high shock forces over small sharp edged bumps which produce high vertical velocities and a harsh stiff ride.

An objective of this invention is to proivde shock absorber valving means to differentiate between road inputs and more specifically to provide reduced shock control over high frequency inputs while retaining control over lower frequency inputs.

This is accomplished by a weighted, spring centered and damped relief valve riding with the unsprung mass which when subjected to the higher rates of vertical acceleration that precede high vertical velocities (high frequency load inputs) results in the opening of an auxiliary flow port, thereby reducing the pressure and control that would normally be developed at high velocities. The valve is designed to remain closed at low frequencies because it is insensitive or unresponsive to low acceleration forces.

The objectives of the present invention and the construction of preferred embodiments will be more fully comprehended from the following description and the accompanying drawing in which:

FIGURE 1 is an elevational view partly in section of a shock aborber incorporating the present invention;

FIGURE 2 is an enlarged view in section of a shock absorber valve embodying the present invention, and;

FIGURE 3 is a modification of the present invention corresponding to the structure of FIGURE 2.

Referring now to the drawings of the presently preferred embodiments of this invention, FIGURE 1 discloses a shock absorber 10 containing an inertia valve assembly 12.

Shock absorber 10 includes a pressure tube 14 that slidably receives a valved piston assembly 16. The piston assembly 16 is secured to a piston rod 18 which in turn is affixed to a sprung vehicle component such as a body member. A closure member 20 seals the upper end of the pressure tube 14. A foot valve assembly 22 seals the opposite end of the tube 14.

The reservoir tube 24 is provided concentric about the pressure tube 14. It defines the outer surface of an annular space 26 that contains a reservoir supply of hydraulic fluid for the shock absorber.

Tube 24 also serves as a housing for the shock absorber 10 and is in sealed engagement with the upper closure member 20. A mounting shaft 28 of the bayonet type extends downwardly from the bottom of tube 24 and is to be secured to an unsprung suspension member such as a wheel support arm.

The piston assembly 16 contains control orifices and valving 15. The foot valve assembly 22 has a rebound replenishing valve 17 and a compression control valve 19. The specific construction of the valving within the piston 16 and foot valve 22 is conventional and therefore is shown schematically.

The lower side of the foot valve assembly 22 is in communication with the reservoir chamber 26 through the port 30. Fluid passes through the port 30 and the valving of foot valve 22 in accordance with the volume displaced by the piston rod 18.

During normal shock absorber operation, that is, during low frequency movements, the piston 16 traverses the length of the pressure tube 14 and fluids pass through the restricted openings contained therein to retard and dampen relative movement between the sprung and unsprung parts.

The pressure tube 14 is contained within a second tube 32 so as to define an axial passageway 34. Passageway 34 may be formed by offsetting the tubes 14 and 32 or it may be created by forming an axial groove along the side of either tube. Piston 16 divides the volume within the pressure tube 14 into a rebound chamber 36 situated above the piston 16 and a compression chamber 38 situated beneath the piston 16. A port 40 is provided in the upper wall of the pressure tube 14 for communication by the rebound chamber 36 with the axial passageway 34.

The valve assembly 12 provides controlled communication between the passageway 34 and the compression chamber 38. The foot valve assembly 22 has a radial passageway 42 in alignment with a port 44 in the wall of the pressure tube 14 at the lower end of the passageway 34. The valve assembly 12 includes a body portion 46 having an axial opening 48 and radial ports 50. Passageway 48 is in communication with axial passageway 42.

A ring-like valve element 52 surrounds and seals the ports 50. Valve element 52 is suspended in a normally closed position by a pair of upper and lower coil springs 54 and 56. The weight of the valve element 52 and the spring rate of the coil springs 54–56 are selected so that the valve assembly 12 is inertia sensitive.

If, in a given jounce situation, acceleration force of the unsprung suspension components with which the body portion 46 of the valve assembly 12 is associated exceed a predetermined design limit, then the ring-like valve element 52 will be displaced downwardly from its sealed position around the ports 50. This will permit pressure fluid contained within the compression chamber 38 to be expelled through the valve assembly 12, passageway 34 and port 40 to the rebound chamber 36. The valve assembly 12 is equally inertia sensitive to rebound vertical movements in which case the fluid flow would be in the reverse direction.

FIGURE 3 discloses a modified valve construction identified as 12'. The valve 12' has a main body portion 146 with a T-shaped passageway 148 connected to the radial passageway 42 of the foot valve assembly 22. Passageway 148 includes radial ports 150. The body member 146 and ports 150 are surrounded by a rebound valve element 152 of significant mass. Valve element 152 has ports 154 normally in alignment with ports 150. A cup-shaped jounce valve element 156 is positioned concentric about the rebound element 152. Jounce valve element 156 has a skirt portion with radial ports 158 normally displaced from the ports 154 of the rebound element 152. The skirt portion of element 156 thus normally closes the ports 154. A spring 160 is interposed between the jounce and rebound valve elements 156 and 152 to keep them in their normally closed position.

During the jounce stroke of a shock absorber 10 having the valve assembly 12', the jounce valve element 156 will be displaced downwardly relative to the other members of the valve assembly if the acceleration forces are sufficient. In such event, ports 150, 154 and 158 will be in alignment to permit fluid flow from the compression chamber 38, through passageway 34, to the rebound chamber 36. During a rebound stroke, rebound valve element 152 will be displaced upwardly so as to provide communication by means of its large ports 154 with ports 150 and 158.

Additional control means are provided to affect the movement of the inertia valve elements 152 and 156. A radial port 162 is located near the base of the jounce valve element 156. Port 162 communicates with the annular space occupied by the spring 160 and is closed by a flapper valve 164. When one of the valves 152 or 156 is moved under the effect of inertia, fluid is expelled through the port 162 and past the valve 164. When the forces associated with the inertia action have ceased, the valve elements 152, 156 will tend to return to their normal position, however, check valve 164 will close port 162 to prevent fluid flow to the area of spring 160. This dampens and delays the recovery action. The combination of the fluid chamber occupied by the spring 160 in conjunction with the port 162 and valve 164 provides a dash pot.

Thus, a preloaded relief valve assembly 162, 164 critically damped in recovery to allow pressure relief at a predetermined rate of acceleration is provided and valve resonance is avoided.

The foregoing description presents the presently preferred modifications of this invention. Other forms may occur to those skilled in the art which will come within the scope and spirit of the following claims.

I claim:

1. In a hydraulic shock absorber having sprung and unsprung components, a pressure tube, a valved piston reciprocable within said tube and dividing the interior of said tube into compression and rebound pressure chambers, a reservoir tube surrounding said pressure tube, valve means closing one end of said pressure tube and providing controlled communication between one of said pressure chambers and the interior of said reservoir tube, exclusive passage means exterior of said pressure tube interconnecting said pressure chambers, an inertia sensitive valve device controlling fluid flow through said passage means, said valve device being spring pressed to a normally closed position but adapted to permit fluid flow by moving to an open position in response to a predetermined minimum acceleration rate of one of said components.

2. In a hydraulic shock absorber having sprung and unsprung components, a pressure tube, a piston reciprocable within said tube and dividing the interior of said tube into compression and rebound pressure chambers, a reservoir tube surrounding said pressure tube, valve means closing one end of said pressure tube and providing controlled communication between one of said pressure chambers and the interior of said reservoir tube, passage means interconnecting said pressure chambers, an inertia sensitive valve device controlling fluid flow through said passage means, said valve device having separate jounce and rebound inertia sensitive valve elements, said valve elements being spring pressed to a normally closed position but adapted to permit fluid flow by moving to an open position in response to a predetermined minimum acceleration rate of one of said components.

3. In a hydraulic shock absorber having sprung and unsprung components, a pressure tube, a piston reciprocable within said tube and dividing the interior of said tube into compression and rebound pressure chambers, a reservoir tube surrounding said pressure tube, valve means closing one end of said pressure tube and providing controlled communication between one of said pressure chambers and the interior of said reservoir tube, passage means interconnecting said pressure chambers, an inertia sensitive valve device controlling fluid flow through said passage means, said valve device having separate jounce and rebound inertia sensitive valve elements, said valve elements being spring pressed to a normally closed position but adapted to permit fluid flow by moving to an open position in response to a predetermined minimum acceleration rate of one of said components, dash pot means adapted to retard relative movement of said valve elements.

4. The combination of claim 3 wherein a dash pot chamber is defined between said separate valve elements.

5. In a hydraulic shock absorber having sprung and unsprung components, a pressure tube, a piston reciprocable within said tube and dividing the interior of said tube into compression and rebound chambers, passage means interconnecting said pressure chambers, an inertia sensitive valve device controlling fluid flow through said passage means, said valve device having separate jounce and rebound inertia sensitive valve elements, a spring interposed between said valve elements and pressing both of them to a normally closed position, said elements being adapted to permit fluid flow by moving to an open position against the force of said spring in response to a predetermined minimum acceleration rate of either one of said components.

6. In a hydraulic shock absorber having sprung and unsprung components, a pressure tube, a piston reciprocable within said tube and dividing the interior of said tube into compression and rebound pressure chambers, passage means interconnecting said pressure chambers, an inertia sensitive valve device controlling fluid flow through said passage means, said valve device having separate jounce and rebound inertia sensitive valve elements, said valve elements being spring pressed to a normally closed position but adapted to permit fluid flow by moving to an open position in response to a predetermined minimum acceleration rate of one of said components, said valve elements being in telescopic engagement and forming a dash pot means therebetween, said dash pot means being adapted to retard movement of said valve elements.

References Cited in the file of this patent

UNITED STATES PATENTS

| | | |
|---|---|---|
| 1,492,328 | Lang | Apr. 19, 1924 |
| 1,961,861 | Mock | June 5, 1934 |
| 2,060,532 | Rossman | Nov. 10, 1936 |
| 2,107,974 | Becherean et al. | Feb. 8, 1938 |
| 2,140,359 | Hanna | Dec. 13, 1938 |
| 2,144,583 | Focht | Jan. 17, 1939 |
| 2,152,661 | Paton | Apr. 4, 1939 |
| 2,412,533 | Petrie | Dec. 10, 1946 |
| 2,445,407 | Rossman | July 20, 1948 |
| 2,774,448 | Hultin | Dec. 18, 1956 |
| 2,916,281 | Hehn | Dec. 8, 1959 |

FOREIGN PATENTS

| | | |
|---|---|---|
| 546,236 | France | Aug. 17, 1922 |